Figure 1:
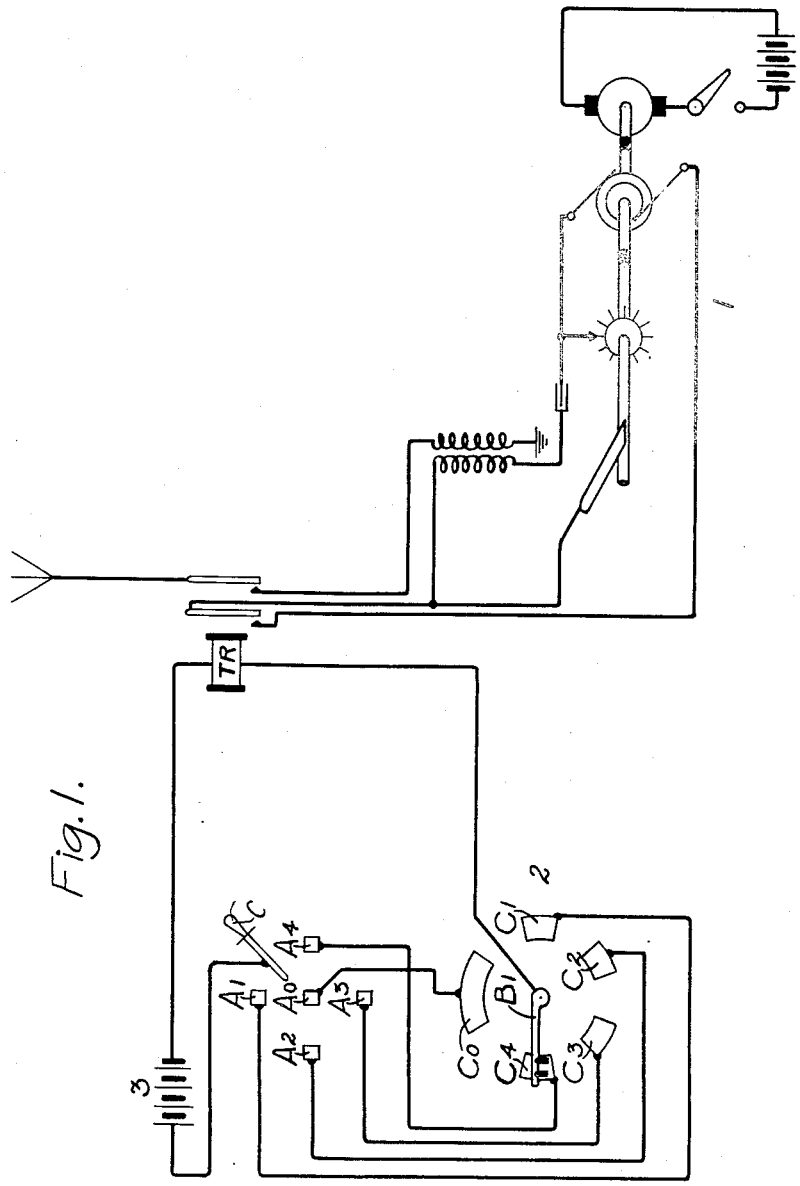

July 15, 1924.

A. A. OSWALD 1,501,683

REMOTE CONTROL SYSTEM

Filed Dec. 6, 1920

6 Sheets-Sheet 1

Inventor:
Arthur A. Oswald.
by C.C. Sprague. Atty.

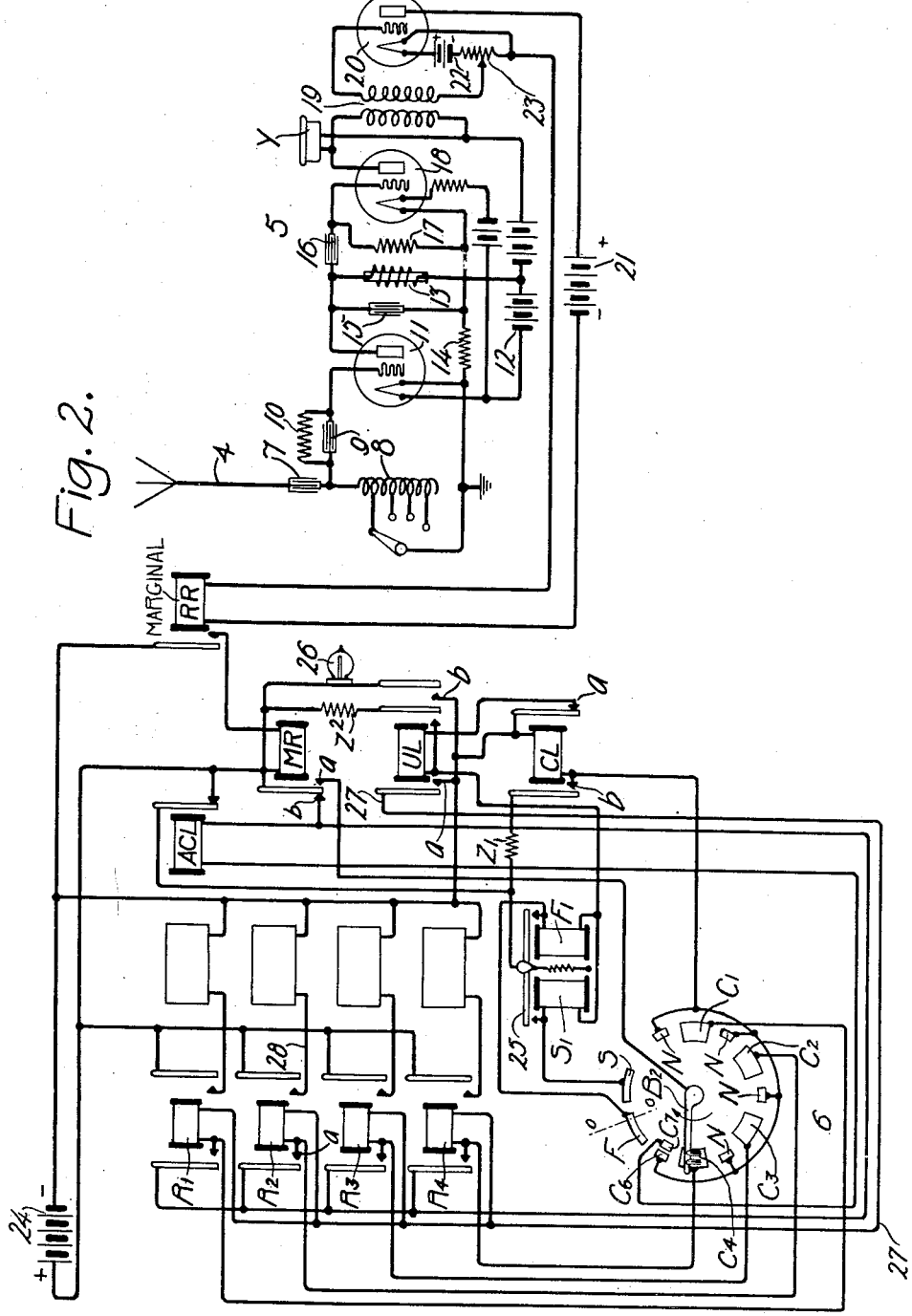

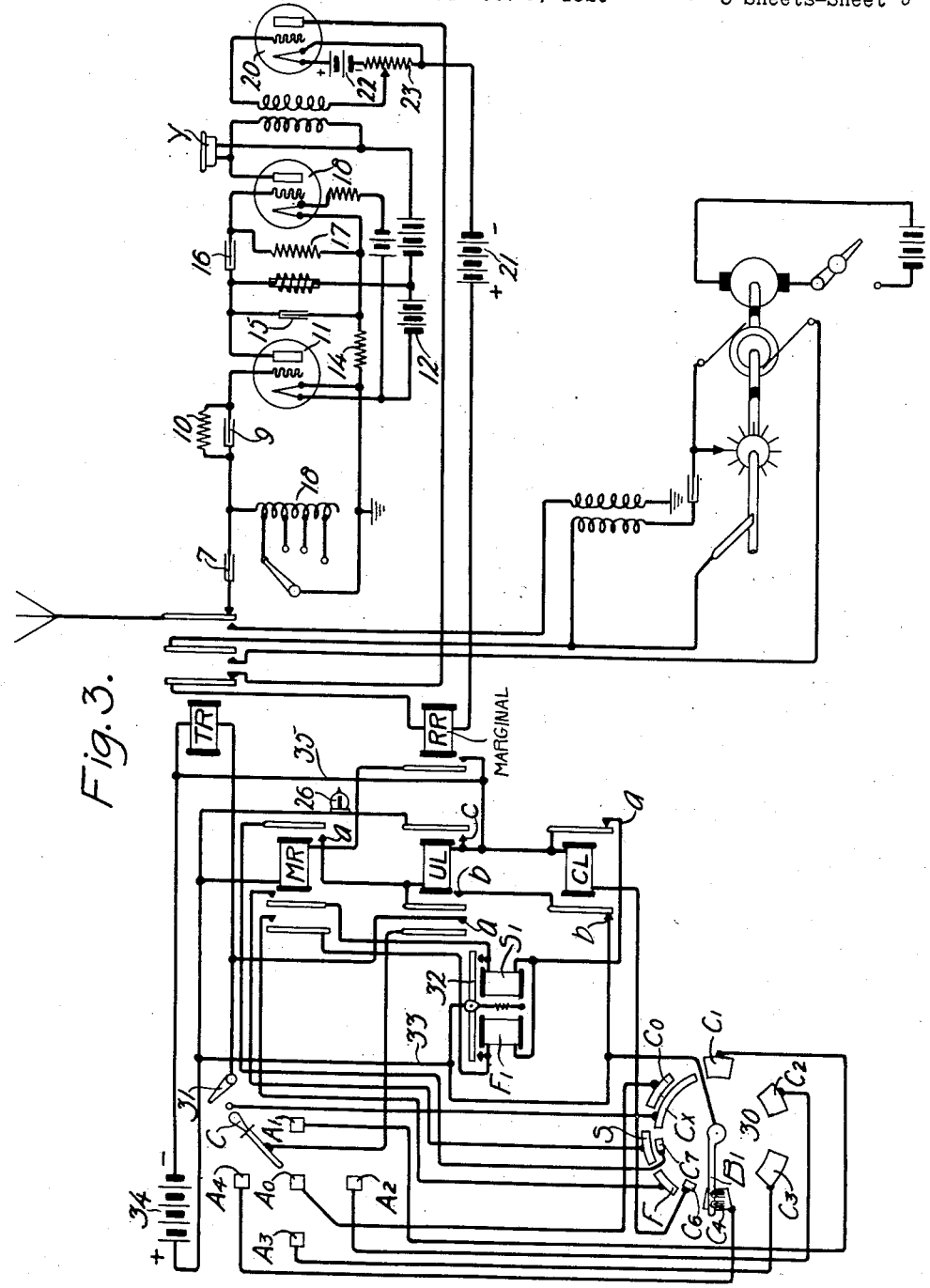

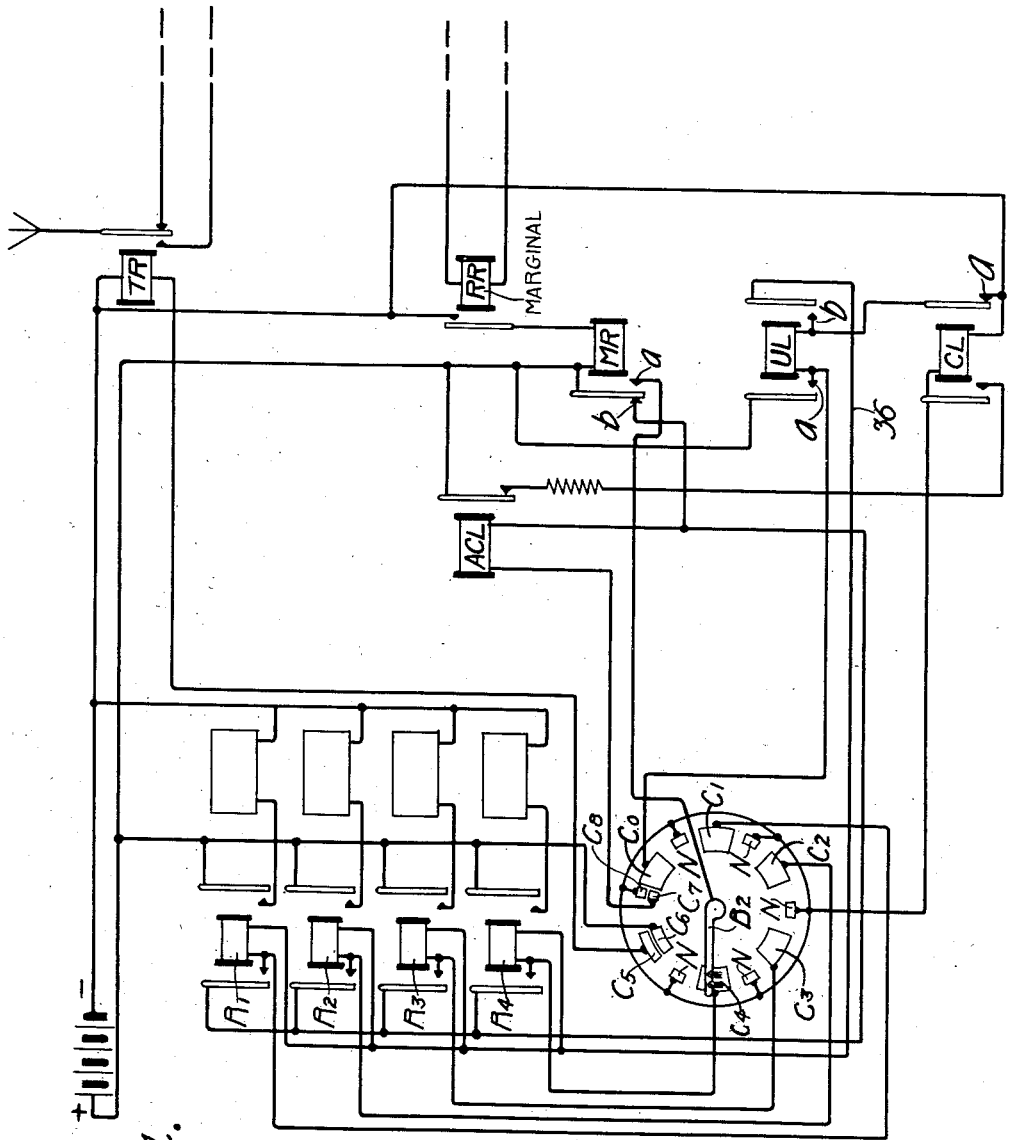

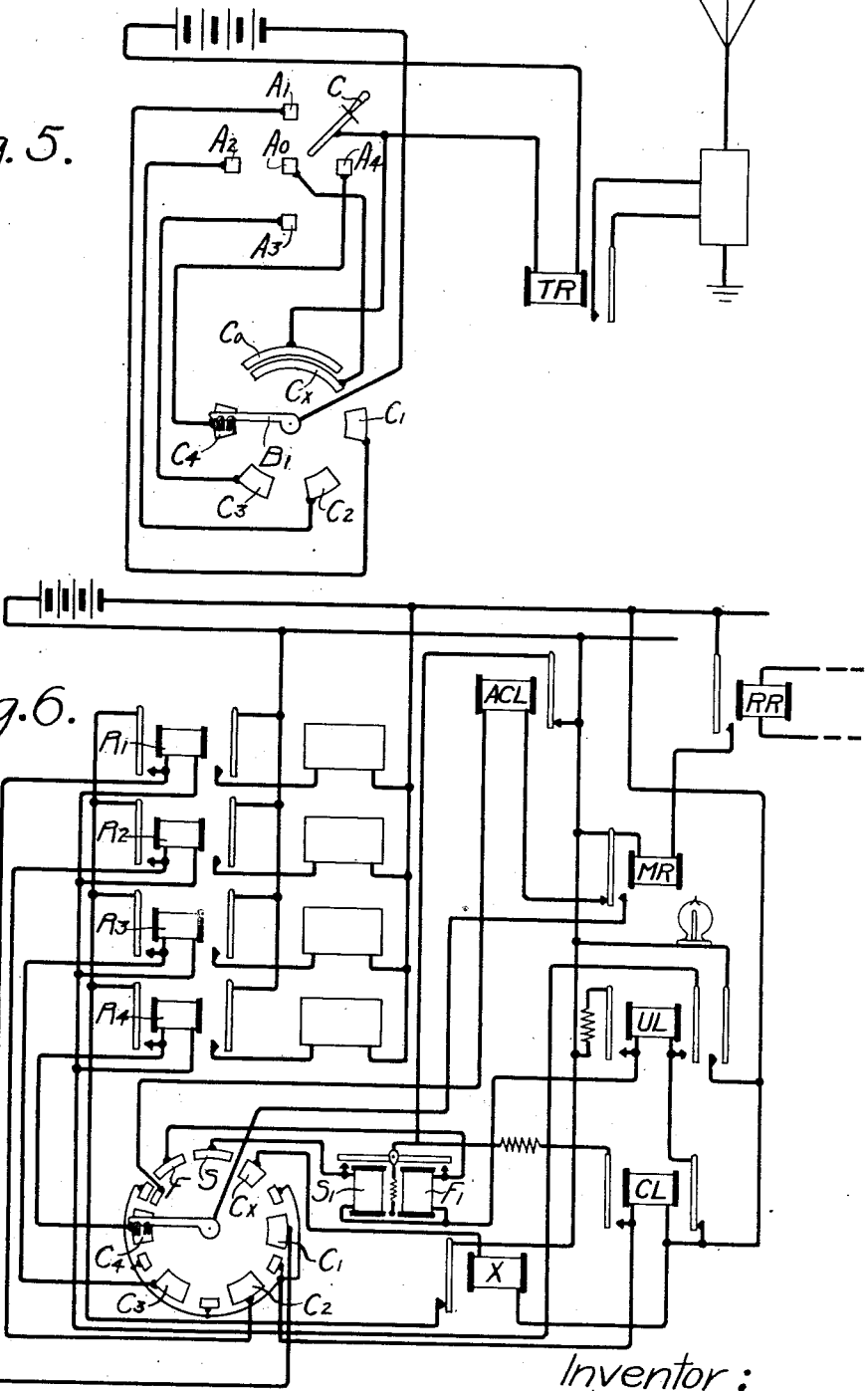

July 15, 1924.

A. A. OSWALD 1,501,683

REMOTE CONTROL SYSTEM

Filed Dec. 6, 1920     6 Sheets-Sheet 6

Inventor:
Arthur A. Oswald.
by C. A. Sprague. Atty.

Patented July 15, 1924.

1,501,683

UNITED STATES PATENT OFFICE.

ARTHUR A. OSWALD, OF BRADLEY BEACH, NEW JERSEY, ASSIGNOR TO WESTERN ELECTRIC COMPANY, INCORPORATED, OF NEW YORK, N. Y., A CORPORATION OF NEW YORK.

REMOTE CONTROL SYSTEM.

Application filed December 6, 1920. Serial No. 428,561.

*To all whom it may concern:*

Be it known that I, ARTHUR A. OSWALD, a citizen of the United States, residing at Bradley Beach, in the county of Monmouth, State of New Jersey, have invented certain new and useful Improvements in Remote Control Systems, of which the following is a full, clear, concise, and exact description.

This invention relates to remote control systems and more particularly to radio systems for determining the course and operation of moving bodies, such as airplanes.

An object of the invention is to provide means whereby a distant mechanism may be quickly brought under control.

Another object of the invention is to provide a teledynamic system in which interference with the controlled mechanism by foreign disturbances or foreign controlling stations may be rendered difficult.

A further object of the invention is to provide means for preventing the transmission of false control impulses and particularly to prevent false operation in consequence of transmission of control impulses at times when the controlled mechanism is not in proper impulse receiving condition. A still further object is to provide means for giving an answer-back or return signal from a distant controlled mechanism to indicate to the controlling operator that the mechanism is in control condition.

An additional feature of the invention consists in the provision of controlling apparatus in a remote control system which may be responsive to control impulses of proper duration but will not be responsive to transient impulses or prolonged impulses.

According to this invention a transmitting apparatus at a control or primary station, and a receiving apparatus at a controlled or secondary station, are each provided with continuously moving mechanisms, such as rotary distributors, which, when in step, are maintained in synchronism by synchronizing impulses transmitted from one of the stations to operate synchronizing apparatus at the other. The secondary station is normally locked, that is, the circuits by which the controls are operated are normally in such a condition that they cannot be energized until the secondary station is unlocked by an impulse from the primary. This unlocking impulse is of such duration that if it occurs at a wrong instant, as for example, when the distributor of a secondary apparatus is in control impulse receiving position, it will cause the secondary mechanism to be locked. The control impulses are of a definite normal duration. Momentary impulses will not operate the control devices. Long impulses will cause the secondary station to lock its circuits in inoperative condition, as will also impulses of proper length if the primary and secondary stations are out of step. It is further necessary that impulses of the proper duration and phase be transmitted in order to affect the controls, and since the secondary mechanism normally automatically locks once in each revolution, a control impulse of proper duration and phase is ineffective unless preceded by an unlocking impulse occurring at the proper instant. The secondary station cannot therefore be readily interfered with.

If it is desired to perform one particular operation at the secondary station, a control impulse is sent out at a particular instant in the time cycle of the moving apparatus, and if it is desired to perform a certain different operation a control impulse is sent out at a correspondingly different instant. These control impulses received by circuits at the secondary station, which are made responsive at the corresponding instants as determined by the synchronously operating mechanism, cause the various operations at the secondary station to be performed.

In some instances, the synchronizing devices may be placed at the primary station which unlocks the normally locked secondary station if approximately in step with it. The secondary station, when unlocked, transmits back a synchronizing impulse. If the synchronizing apparatus is placed at the secondary station, the primary station may transmit an impulse which will serve both for unlocking and synchronizing.

Where it is desired to secure control of a plurality of different controls simultaneously, the primary may be provided with a plurality of separate controlling elements and the secondary with a corresponding number of cooperating control elements.

In the drawing, Figure 1 indicates diagrammatically one arrangement of apparatus and circuits at a controlling or primary station; Figure 2, that of a cooperating controlled or secondary station; Figures 3 and 4, the primary and secondary stations, respectively, of a modified form; Figures 5 and 6, those of a further modified form, and Figures 7 and 8 those of a still further modification.

Referring to Figure 1, a radio transmitting apparatus 1 is illustrated in connection with the rotary distributor 2, and its controlling circuits. The radio transmitting apparatus, which may be of any desired type, is illustrated conventionally as a spark discharge arrangement for producing and radiating trains of waves of a duration determined by that of the operation of a transmitting relay TR. The rotary distributor 2 comprises a disk, or face member, represented diagrammatically by its contact segments, $C_0$, $C_1$, $C_2$, $C_3$, $C_4$, and a brush or contacting element $B_1$. Either the disk or the brush is rotated about the central axis of the disk by a driving motor operating at a substantially constant speed, and the member not driven remains stationary, but is adjustably fixed with respect to the axis of the constantly rotating member and is provided with a handle or other adjusting mechanism, not shown, whereby the operator may arbitrarily shift its position to expedite synchronization of the primary apparatus with the secondary apparatus at the beginning of operations. Associated with the distributor 2 is a control switch C, such as the "control stick" of an airplane, and this carries an electrical contactor for engagement with the contacts $A_0$, $A_1$, etc., connected respectively to the correspondingly numbered contact segments of the stationary disk. Normally the control switch is in neutral position on contact $A_0$.

It will be evident that during each revolution of the rotating member, which may be assumed to be brush $B_1$, relay TR will be energized from source 3 and if the circuit of the direct current driving motor of transmitter 1 has been closed there will be transmitted a radio impulse or train of waves, when the brush $B_1$ contacts with a contact segment connected to the contact upon which control switch C is placed. The duration of this impulse is determined by the period of transit of the brush $B_1$ over the contact segment and accordingly by the angular length of the arcuate contact segment. If C is placed on any of the contacts, $A_1$ to $A_4$ inclusive, a control impulse of a definite duration is transmitted, beginning at a certain point in each cycle. If C is placed on $A_0$, a much longer synchronizing impulse is transmitted in each cycle beginning at a different point.

In Figure 2 a secondary station is illustrated, comprising a receiving antenna 4, with its associated receiving apparatus 5, including a receiving relay RR, which operates in conjunction with the rotary distributor 6 to determine the operation of the synchronizing apparatus. The various parts of the secondary station may now be considered in detail.

The receiving apparatus preferably consists of a tuned open antenna circuit, comprising a variable capacity element 7 and a variable inductance 8, by which the circuit of the antenna 4 may be tuned to the frequency of the impulse waves transmitted from the primary station. Connected to one terminal of the inductance through a blocking condenser 9, with a high resistance grid leak 10, is the impedance control element of a thermionic detector 11, preferably of the highly evacuated three-element type. The other active terminal of the inductance is grounded and connected to the cathode of detector 11. The space current circuit in this detector includes a source 12, of unidirectional current, and a choke coil 13. The alternating current output path of the detector is connected directly to the discharge electrodes of the detector and comprises a series resistance 14, a shunting capacity element 15 for by-passing high frequency components of the alternating current without passing the detected or low frequency components, a series stopping condenser 16, preferably of low impedance to currents of the frequency of the signaling or control impulses, and a resistance 17, across the terminals of which the input elements of an amplifier 18 are connected. This amplifier, which is preferably a device of the same general type as the detector, amplifies the alternating detected current or trains of group impulses and impresses the amplified energy thereof, by means of transformer 19, upon the input circuit of a vacuum tube relay 20, the function of which is to integrate the periodic or alternating current energy and supply a unidirectional impulse to marginal receiving relay RR, the winding of which is in series in the space current circuit with space current source 21. Obviously the circuit arrangements for detecting the incoming energy, amplifying it and supplying it to the integrating relay tube may be variously modified without departing from the spirit of invention.

Relay tube 20 comprises a filament, heated by a source 22, in series with which is a resistance 23. The input circuit of tube 20 is connected to a point in resistance 23 which is negative with respect to the filament and the grid or impedance control element is thus maintained at a normal negative potential such that the space current through the winding of relay RR is substantially zero or at least much below that required to energize the relay. The effect of a train of impulses impressed on the input circuit is to decrease the impedance of the tube and to permit sufficient current to flow there-through to energize relay RR. A weak disturbance will not sufficiently decrease the tube impedance to cause the relay to operate. The relay RR is preferably designed to have the difference between its minimum operating current and its maximum release current very small and the circuits of the tube, its internal characteristics, and the voltages of the space current and polarizing sources are preferably so designed and chosen that the change in current for small changes of voltage through the range of the operating and release current is rapid and the ratio of the operating current to the release current approaches unity.

The rotary distributor 6 consists of a brush $B_2$ cooperating with contact segments $C_1$, $C_2$, $C_3$, etc. Associated with the distributor 6 and its contacts $C_1$, $C_2$, etc., are an unlocking relay UL and a relay CL, hereinafter termed a control lock. These relays are energized by a common source 24, and with master relay MR, receiving relay RR, auxiliary control lock ACL, and synchronizing magnets $S_1$ and $F_1$, serve to determine the selection and operation of control relays $R_1$, $R_2$, $R_3$, $R_4$, by which the desired operations at the secondary station are performed. The function of the synchronizing magnets $S_1$ and $F_1$ is to operate the armature 25 so as to maintain distributor brushes $B_1$ and $B_2$ in synchronism. Unlock relay UL has two functions. It operates an indicator 26 and unlocks control relays $R_1$, $R_2$, $R_3$ and $R_4$ by closing their common return conductor 27, whenever a synchronizing magnet is operated. Auxiliary control lock ACL energizes whenever brush $B_2$ wipes contacts $C_6$ and $C_7$ and opens the holding circuit of the synchronizer magnets, thus releasing armature 25. Control lock CL operates to lock the control relays in inoperative condition and to release the synchronizer magnets if an impulse from any source arrives at an improper time. Relay ACL requires a small current and relay CL requires a relatively large current, the values of these currents being so related that the current required to operate the auxiliary control lock is insufficient to hold the control lock energized. The master relay MR energizes each time with receiving relay RR and is provided with make before break contacts.

The synchronizer magnets $S_1$ and $F_1$ are connected to contact segments S and F and have a common return to battery 24 through winding UL and normally closed contact of relay CL. Synchronizer armature 25 is pivoted at its center, and when attracted by magnet $S_1$ or magnet $F_1$ establishes a connection from positive battery through the contact of relay ACL and armature 25 to whichever magnet attracted the armature, and through winding UL and contact $a$ of CL to negative battery, thereby locking the armature in that position. The time required for magnet $F_1$ to attract and lock armature 25 is equal to the time required for brush $B_2$ to traverse the distance from line O—O in clockwise direction to the end of segment F. Hence, if an incoming signal energizes relay MR, thereby connecting $B_2$ with positive battery, when $B_2$ is in contact with F at some point to the left of O—O, then magnet $F_1$ will succeed in attracting and locking 25 to itself, and immediate subsequent energization of magnet $S_1$ will not cause armature 25 to be pulled away from its locked position at $F_1$, because of the stronger force exerted by magnet $F_1$. On the other hand, if the incoming signal impulse reaches $B_2$ after this brush has passed O—O, armature 25 will remain neutral or be attracted and locked by magnet $S_1$, depending on the length of the impulse.

When armature 25 is in its neutral position, brush $B_2$ revolves at its normal speed, which is the same as that of the primary brush $B_1$, within the limits of practical construction. When armature 25 is attraced by $F_1$ or $S_1$, it operates mechanically upon the governor of the motor driving the brush to speed up or slow down $B_2$. Obviously it may be so arranged as to control the field of the motor, where an electrical motor is used, or it may be made to operate on a transmission gearing by which the motor drives the brush, in a manner well known in the rotary distributor art. Other equivalent synchronizing arrangements which may be substituted will readily occur to those skilled in the art. At the end of each revolution, armature 25 is released by the operation of the auxiliary control lock ACL in pulling up its armature as brush $B_2$ traverses contact segments $C_6$ and $C_7$, and brush $B_2$ then resumes its normal speed. This brush accordingly has three speeds,—normal, with armature 25 in neutral position, slow, when the armature is attracted to $S_1$, and fast when attracted to $F_1$. These speeds never change and brush $B_2$ has a constant speed throughout any particular revolution, but the speeds of successive revolutions differ, as they may be normal, fast or slow.

A practically synchronous condition is maintained between the two brushes by a continuous automatic phase shift operation. Assume that the two brushes are approximately in synchronism and have nearly the proper phase relation with respect to each other. Assume further that the synchronizing impulse from the primary station arrives early, that is, when brush $B_2$ is in contact with segment F to the left of line O—O. Then magnet $F_1$ attracts armature 25 for one revolution and brush $B_2$ makes that revolution at maximum speed. In so doing, brush $B_2$ advances its phase relation to the primary brush, so that when the next synchronizing impulse arrives, brush $B_2$ will have a new position with respect to line O—O, which will be either at O—O, on the left side of O—O or beyond O—O. In the first case, magnet $F_1$ will again attract armature 25 and $B_2$ will make another revolution at maximum speed, thereby again advancing its phase, while in the second case armature 25 will either remain neutral or be attracted by magnet $S_1$. If the armature remains neutral, there will be a small phase shift during the succeeding revolution due to the difference between the absolute speed of the two brushes. If the armature is attracted by magnet $S_1$, the succeeding revolution of brush $B_2$ will be at minimum speed. This will produce a backward phase shift with respect to the primary brush and will result in brush $B_2$ having a retarded position with respect to O—O at the beginning of the next synchronizing impulse. It will be seen therefore that the synchronizer influences brush $B_2$ to hunt the line O—O as its true synchronous position at the instant relay RR responds to the incoming impulse.

Assume that the distributor mechanisms at the primary and secondary stations are in operation with the primary control switch C on contact $A_0$. Once each revolution a synchronizing impulse will be transmitted from the primary station. The control relays $R_1$, etc., at the secondary station are locked open by reason of the break in conductor 27 at the contact $a$ of relay UL. Hence they cannot be operated until UL operates, and since this relay is in series with the synchronizing magnets $S_1$ and $F_1$, one or the other of these magnets must be energized. This requires that the synchronizing impulse from the primary station reach the secondary station while brush $B_2$ is in contact with either segment S or F. If this occurs, and unlock relay UL be energized, it will close contact $b$, energizing an indicator 26, shown for simplicity as a lamp but which is representative of any means for giving to the operator at the primary station a return indication which may be audible, visible, or a radio signal. If no such indication of synchronization is received, the primary operator may shift the stationary member of his distributor apparatus to expedite the synchronizing action. The segment $C_0$ at the primary station is made equal in length to a control segment, plus the distance between successive control segments. The synchronizing impulse is therefore of such length that unless it arrives at the time when brush $B_2$ is within the limits of operation of the synchronizer, a circuit will be closed from brush $B_2$, normally opened contact $a$ of relay MR, battery 24, control lock CL, and one of the contact segments $C_6$ or N. The control lock in energizing, opens its armature contact $a$, thus opening the circuit of relay UL. The effect of this is to release armature 25 and to open armature contact $a$ of relay UL, thereby locking the control relays against operation. When control lock CL energizes, it closes armature contact $b$, establishing a holding circuit for itself by way of resistance $Z_1$, normally closed armature contact of relay ACL and back to battery. This maintains the control relays locked against operation until the control lock holding circuit is opened by relay ACL. Accordingly, the synchronizing impulse serves as a locking impulse unless it arrives within the synchronizing interval. The same locking effect will be produced by any interfering impulse which energizes MR while $B_2$ engages the contact segment $C_6$ or N.

When brush $B_2$ next traverses contact segments $C_6$ or $C_7$, it closes a circuit through relays CL and ACL in series, unless relay MR is energized. If this series circuit is closed, it causes ACL to receive sufficient current to open its armature contact and break the holding circuit for the control lock. The series current is not sufficiently large to energize CL, which upon the opening of its holding circuit will release. Consequently in the absence of a received impulse at the instant $B_2$ traverses $C_6$ and $C_7$ the control lock de-energizes and the synchronizing system and unlocking relay are in condition to be operated by a synchronizing impulse of the proper wave frequency and phase. If an impulse is received from a disturbing source, or a synchronizing or control impulse be transmitted while $B_2$ is on $C_6$, the relay ACL will not be operated and control lock CL will remain energized from its holding circuit to keep the control relays locked against interference or false control during the succeeding cycle.

When the two distributors are in synchronism, they will be automatically maintained in synchronism as previously explained. If now the operator at the primary station shifts switch C to a control contact, such as $A_2$, the primary station will transmit a control impulse to energize relays RR and MR as brush $B_2$ wipes contact segment $C_2$. The previous synchronizing impulse left unlock relay UL and one of the synchronizer magnets energized over holding circuits, and consequently the control impulse finds the conductor 27 closed at contact $a$ of UL and there is a closed circuit from battery by way of contact $a$ of MR, brush $B_2$, contact segment $C_2$, control relay $R_2$, conductor 27, and contact $a$ of relay UL, back to battery. The control relay $R_2$ accordingly energizes and performs its desired operation, as for example, by closing the local operating circuit 28. As it energizes, relay $R_2$ closes an armature contact $a$, establishing a holding circuit for itself thru contact a of relay UL and contact b of relay MR, this latter contact closing in consequence of the make before break operation of MR before contact a of MR opens. Resistance $Z_2$ and winding UL are in a parallel holding circuit, including battery 24.

If during the succeeding cycle no impulse is received during transit of brush $B_2$ over contacts N, control relay $R_2$ will remain energized over its holding circuit until the brush reaches contacts $C_6$ and $C_7$. If, at that instant, no impulse is received, the normal operation of relay ACL will merely release the synchronizer armature 25 without affecting UL or $R_2$. The next synchronizing impluse or any received impulse before $B_2$ reaches contact segment $C_2$, will energize relay MR to open the holding circuit of $R_2$. A synchronizing impulse, when $B_2$ is on $C_6$ and $C_7$, will cause CL to open the holding circuit of UL and so cause $R_2$ to release. It is accordingly evident that no control of the secondary apparatus can be had unless synchronizing impulses be transmitted at the proper instants, that brief synchronizing or control impulses are ineffective, and that disturbances between the normal periods for control impulses, or a prolonged or ill-timed control impulse will cause the secondary mechanism to automatically lock its controls in inoperative condition. The marginal receiving relay RR and the integrating relay tube 20 prevent tampering with the secondary station by either small amplitude or momentary impulses.

Referring to Figure 3, a modified form of primary station is illustrated, with the synchronizer magnets at the primary station. The radio transmitting apparatus and receiving apparatus may be similar to the radio transmitter and receiver of the arrangements illustrated in Figures 1 and 2 respectively. The rotary distributor 30 is provided with a somewhat different arrangement of contact segments to cooperate with the synchronizer apparatus and to permit either a normal unlocking or a prolonged locking impulse to be transmitted from the primary to the secondary station.

The secondary mechanism (see Fig. 4) is likewise provided with radio receiving and transmitting apparatus, of which only relays RR and TR are shown. Master relay MR, control lock CL, unlock relay UL, and auxiliary control lock ACL function in a manner somewhat similar to the correspondingly designated members of the arrangement of Figure 2. In the modification of Figure 4 the secondary station normally transmits an unlocking impulse once each revolution. This is received at the primary station and if the primary station is in step it operates an unlock relay to unlock the primary transmitter and permit it to transmit unlocking, locking, or control impulses to the secondary station. The same impulse which serves to unlock the primary, acts, if the two mechanisms are approximately in step, to synchronize the primary mechanism with that at the secondary station. The primary station now transmits an unlocking impulse to the secondary station to unlock the control circuits. Thereafter the primary station sends such control impulses as are necessary to operate the desired controls. If it be desired to keep the secondary station locked, the operator at the primary station closes a locking switch 31 to connect to the neutral contact a long segment $C_x$, preferably of the length of a control segment plus twice the distance between the control segments, so as to transmit a correspondingly long impulse. Long impulses or wrongly timed impulses will cause the secondary station apparatus to automatically lock its controls in inoperative condition.

The arrangement of the various circuits may be made clear by tracing the cycle of operation. Assume, for example, that the radio apparatus is in operative condition and the distributors are driven by their respective motors at as near the same speeds as independent motors can be made to operate in a practical system. The energizing circuit of relay TR at the primary station, if switch 31 is open, is interrupted at contact a of relay UL. This relay can only be energized by operation of the master relay MR in closing its armature contact a. Consequently it is clear that with switch 31 open there will be no impulses transmitted from the primary station until its transmitter is unlocked by energy from the secondary station. To energize primary station unlocking relay UL, energy must arrive so as to operate MR during the instant when brush $B_1$ is traversing contact $C_7$. Referring to the diagram of the secondary station, Figure 4, it will be seen that as brush $B_2$ traverses contacts $C_5$ and $C_6$, relay TR will be energized to transmit an unlocking impulse to the primary station. If this occurs within the synchronizing range, it will operate, as in the system of Figure 2, to synchronize the two mechanisms. If however, it occurs when $B_1$ is traversing $C_7$, it will not only actuate the synchronizing apparatus but also energize unlock relay UL. When actuated, the synchronizer magnet closes a holding circuit by way of armature 32, conductor 33 to positive pole of battery 34, battery, conductor 35 and normally closed contact a of control lock CL. Similarly, UL, when actuated, closes its armature contact b, completing a holding circuit from positive battery, conductor 33, armature contacts b of relays CL and UL, winding of relay UL and conductor 35, back to battery. The effect of the operation of relay UL is therefore to unlock the primary transmitter by closing armature contact $a$, thus connnecting control switch C to transmitting relay TR, and further to indicate to the operator by the energization of the circuit of an audible or a visible indicating device 26 through armature contact $c$ of relay UL, that his primary control is released. If no indication is given by indicator 26, the primary operator must proceed to shift the stationary member of the distributor until synchronism and phase coincidence is indicated. Suppose that control switch C is in neutral position at $A_0$. As the brush $B_1$ wipes contact segment $C_0$, a secondary unlocking impulse will be transmitted to the secondary station as brush $B_2$ is in contact with its segment $C_0$, and secondary unlocking relay UL will be energized from a circuit from positive battery, armature contact $a$ relay MR, brush $B_2$, contact segment $C_0$, winding of UL, normally closed contact $a$ of control lock CL, back to negative battery. In energizing, relay UL pulls up its armature contacts $a$ and $b$, the former closing the holding circuit for the relay, which includes battery, armature contact $a$ of relay UL, winding UL, and contact $a$ of relay CL, and the latter unlocking the control relays $R_1$, etc., by closing their common return conductor 36. The secondary station control relays will now be held unlocked until $B_2$ again wipes $C_7$ and $C_8$, unless an interfering impulse is received when $B_2$ is on a segment N. If such an interfering impulse is received, it causes energization of the control lock relay CL, which opens up its armature contact $a$ to break the holding circuit of relay UL, and cause relays $R_1$, etc., to be again locked in inoperative condition. If no interfering impulse is received, a control impulse of the proper amplitude and duration arriving at a definite instant, will cause a particular one of the control relays to be energized and to close its own holding circuit. As in the circuit arrangement of Fig. 2, the control lock relay CL pulls up a holding circuit for itself through the normally closed armature contact of the auxiliary control lock ACL. If contact $b$ on relay MR is closed, the auxiliary control lock is energized when brush $B_2$ sweeps over segments $C_7$ and $C_8$ to close the series circuit through relays CL and ACL. The current is insufficient to energize the control lock and the auxiliary control lock opens its armature contact and the holding circuit of the control lock, thus permitting the control relays to be unlocked by UL as brush $B_2$ traverses $C_0$. However, if it is desired to keep the secondary controls locked, the operator at the primary station throws switch C to neutral at $A_0$ and closes switch 31. A long impulse is sent out from the primary station as brush $B_1$ traverses segment $C_x$, and this impulse arrives at the secondary station in time to operate relay MR and open its armature contact $b$ before brush $B_2$ connects segments $C_7$ and $C_8$. Consequently, auxiliary control lock ACL will not be energized and the holding circuit of control lock CL will remain closed as long as the primary operator continues to send long locking impulses from C. Since the secondary station continues to send out synchronizing impulses, the mechanisms at the primary station will be kept in synchronism. If the synchronizer failed, the secondary would remain locked due to the long signal overlapping a control interval and operating relay CL by means of contacts N.

In the arrangement of Figs. 5 and 6, the synchronizing impulses are transmitted from the primary station, at which there is no locking action, and the primary operator depends upon a return indication or signal from the secondary station to indicate synchronism. The primary station is provided with a segment $C_0$ independent of switch C and this transmits a synchronizing impulse every cycle. If however, switch C is on neutral at $A_0$, the contact segment $C_x$ lengthens the synchronizing impulse to make it serve as a control release impulse.

At the secondary station, represented by Figure 6, the circuits are identical with those of Figure 2 except that there is provided an extra relay X, and contact segment $C_x$ which operates, when the control release impulse is transmitted, to open the armature contact of relay X to interrupt the common return of the control relays and release any control relay, $R_1$, $R_2$, etc., which may happen to be energized. This release impulse, unlike those occuring at improper times, does not affect the control lock and consequently does not disturb the synchronizer. If switch C at the primary station is on a control contact, the first control impulse closes the control relay at the secondary station, the synchronizer continues to function throughout the control period, and relay X releases the control relay on the first long synchronizing or release impulse following the return to neutral of the control switch C at the primary station.

Figure 7:
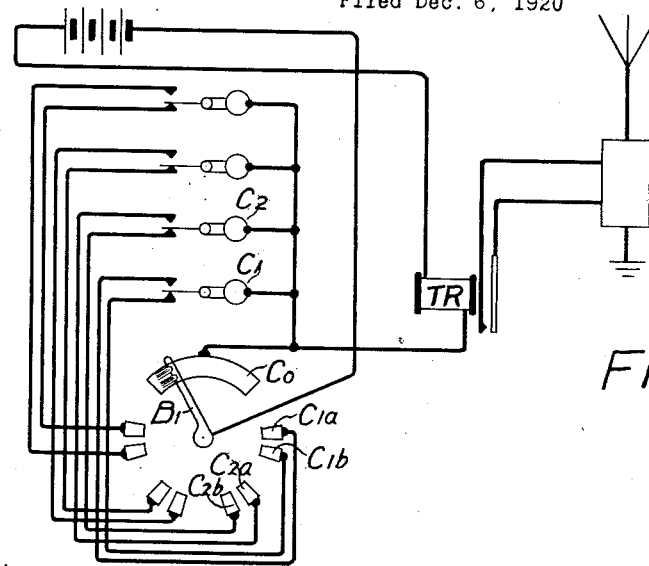
Figure 8:
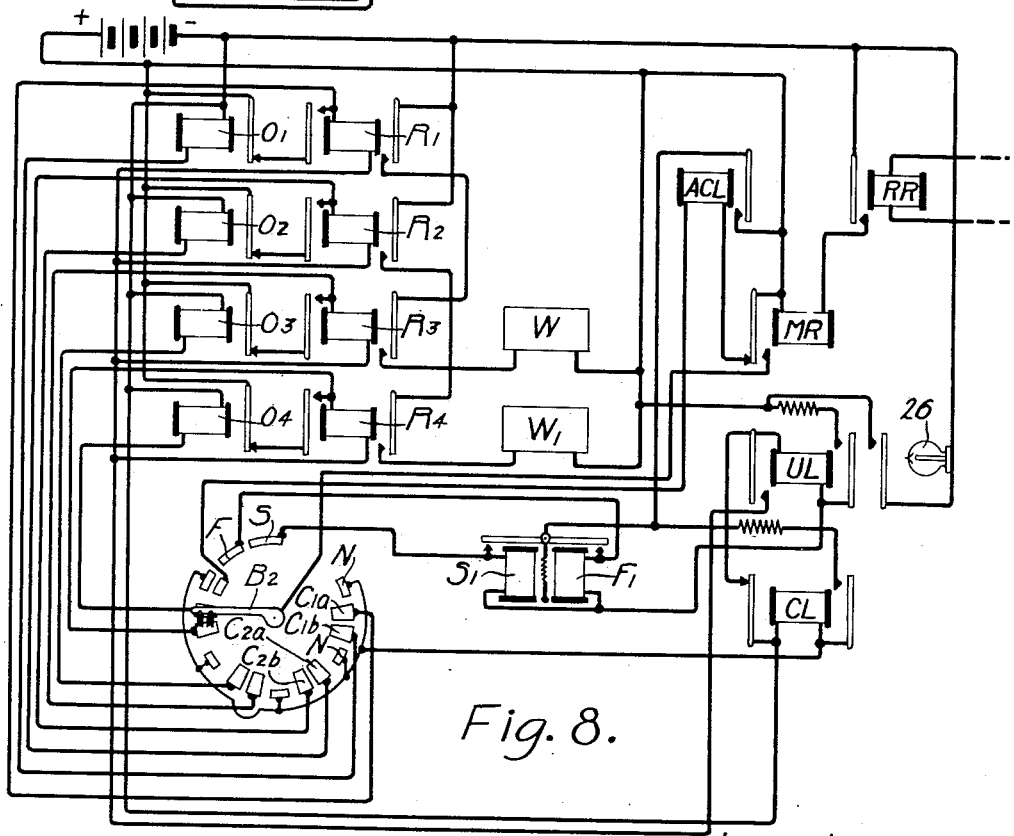

In some cases, it is desirable to be able to operate several controls, each wholly independent of the others. A modified system which will accomplish this is shown in Figures 7 and 8. In this system the synchronizing functions are independent of the controls. The rotary distributor of the primary station is provided with the usual synchronizer segment $C_0$ and the pairs of segments $C_{1a}$, $C_{1b}$, $C_{2a}$, $C_{2b}$, for each of the controls at the secondary station. There is an individual control switch $C_1$, $C_2$ for each control and the normal position of each switch is on its lower contact to connect the second or $b$ contact segment to transmitting relay TR. When a control switch is moved to its upper position, it connects its $a$ contact segment to transmitting relay TR. At each revolution of brush $B_1$, the transmitting relay causes a synchronizing impulse to be sent when in contact with segment $C_0$, and an impulse for each control sent from either the $a$ or $b$ segments, depending upon the control switch position. At the secondary station, Figure 8, a control impulse arriving when brush $B_2$ is on an $a$ contact causes the corresponding closing control relay $R_1$, etc., to energize and close a holding circuit for itself and an impulse arriving when the brush is on a $b$ segment causes the corresponding opening control relay $O_1$, etc., to open the closed circuit of the associated control relay.

To further protect against interference, controls 1 and 3, and 2 and 4 may be combined to make it necessary to close a pair of relays to obtain a final control action. For example, in the arrangement of Fig. 8 it is necessary to operate both $R_1$ and $R_3$ to close the circuit for operating mechanism W and to operate both $R_2$ and $R_4$ to close the circuit for $W_1$. If this is done, the protecting segments N are no longer absolutely necessary and may be eliminated.

The common battery at each station serves to operate a number of different relays. To permit operation of the various circuits without putting low impedance shunts across parallel circuits from the same source, impedances $Z_1$ and $Z_2$ are provided as shown.

In each instance a receiver Y of high impedance may be shunted across the output of the detector circuit to enable an attendant to listen for instructions or to facilitate tuning the receiving apparatus.

Although four different modifications of remote control systems according to this invention have been illustrated and described, it is to be understood that the features of this invention are not to be limited thereto but are of general application.

Certain broad features shown but not claimed herein, relating to the synchronous control of the transmitting and receiving stations, are being claimed in my copending application, Serial No. 428,948, filed December 7, 1920.

What is claimed is:

1. A transmitting device for transmitting impulses at timed intervals, a receiving device for receiving said impulses and means actuated by said receiving device in response only to impulses received at definite instants and of duration between two fixed limits.

2. A wave transmitter, a wave receiver, and means including a marginal current-responsive device actuated by said receiver only in response to waves having a given frequency, a given intensity and a wave train duration between two fixed limits.

3. An impulse transmitter, an impulse receiver, means associated with said receiver for controlling the movements of an airplane in response to impulses of a given duration received from said transmitter, and means associated with said receiver and actuated in response to very short impulses or excessively long impulses for locking said receiver against operation.

4. A transmitting station having a rotary distributor, a receiving station having a rotary distributor, said transmitting distributor, comprising means for transmitting to said receiver controlling impulses and long locking impulses, control apparatus associated with said receiving distributor responsive to received control impulses occurring at the proper time interval and of the proper duration, and means responsive to said long locking impulses for rendering said control apparatus temporarily unresponsive to received impulses.

5. A receiving station having a plurality of distinct controlling devices, a distant control station having means for transmitting impulses in definitely timed sequence to said receiving station, and means at said receiving station responsive only to impulses received within definite time intervals for operating each of said controlling devices regardless of the operation of the others, and responsive to prolonged or wrongly timed impulses for preventing the operation of said controlling devices.

6. A periodically acting switch, a controlled mechanism associated therewith and responsive to received controlling impulses, means responsive to locking impulses of greater duration than said controlling impulses for locking said mechanism against response to received energy, and means controlled by said switch for unlocking said locked mechanism.

7. In combination, a primary station having means for transmitting controlling impulses, a secondary station having associated therewith means for controlling apparatus, said controlling means being normally locked in inoperative condition, and means responsive to an impulse of a given duration from said primary station for unlocking said controlling means and putting it in operative condition and responsive to long locking impulses for maintaining said controlling means locked.

8. In combination, a receiving station comprising control elements normally locked in non-responsive condition, a rotating switch, a distant primary controlling station having a rotating switch, and means for transmitting an impulse from said primary station to said receiving station for synchronizing said switches and unlocking said control elements to restore them to responsive condition.

9. A receiving station comprising a rotary distributor having a plurality of operating segments and a contacting brush traversing said segments in sequence cyclically, energy-receiving means associated with said brush, locking segments placed between said operating segments, operating circuits, and means associated with said receiving means, said brush, and said segments for energizing one of said operating circuits in response to an impulse received during transit of said brush over an operating segment only, and for preventing energization of an operating circuit in consequence of receipt of energy during transit of said brush over a locking segment.

10. A receiving station comprising a continuously operating switching mechanism, airplane steering elements associated therewith, means connected to said switching mechanism and responsive to received energy impulses of proper duration and of proper phase with respect to the operation of said mechanism for operating said elements to steer said airplane and responsive to impulses of other phase with respect to the operation of said mechanism for preventing the operation of said elements.

11. In combination, a transmitting station, a controlled apparatus remote from said station and means associated with said apparatus and responsive to an operating impulse transmitted from said station for causing operation of said apparatus, but not responsive to said operating impulse, except when it is preceded at a definite time interval by an unlocking impulse of a duration between fixed minimum and maximum limits.

12. In combination, two rotary distributors, means under the control of one of said distributors to transmit synchronizing impulses to the second distributor, members to be controlled associated with said second distributor, a synchronizer at said second distributor comprising two correcting magnets and two arcuate contacts cooperating with the moving element of said second distributor, one of said contacts lying entirely in advance of the other, means whereby initiation of an impulse when said moving element engages one contact operates one of said magnets and initiation of an impulse when said element engages the other contact operates the other of said magnets, and means responsive to an impulse operating either of said correcting magnets for conditioning said members for operation.

13. In combination, two rotary distributors, means at one of said distributors for transmitting synchronizing impulses to the second distributor, devices to be actuated associated with the second distributor, a synchronizing device at said second distributor having an accelerating device and a retarding device, means responsive to said impulses to energize either of said devices according to the relative phases of the distributors and to maintain said device energized thereafter during substantially a cycle of the distributor, and means dependent upon the receipt of a synchronizing impulse for conditioning said devices for actuation.

14. A controlled mechanism and a controlling mechanism each having rotary distributors, means normally locking said controlled mechanism against operation, means operative when said distributors are in synchronism to unlock said controlled mechanism and means whereby interfering or disturbing energy causes said controlled mechanism to again become locked.

15. A controlled mechanism and a controlling mechanism each having rotary distributors, means operative when said distributors are synchronized to render said controlled mechanism responsive to controlling impulses, means responsive to disturbing impulses to render said controlled mechanism unresponsive and periodically operating means to render said controlled mechanism responsive after said disturbing impulse ceases.

16. In a secrecy system, a receiving station comprising mechanism for measuring timed intervals in operational cycles, each cycle comprising a plurality of timed intervals, devices to be controlled in response to received energy, means responsive to definitely timed energy impulses received throughout a cycle for selectively actuating said devices, and means responsive to energy received in the last timed interval of a cycle for positively locking all of said devices against operation throughout the next succeeding cycle.

17. In a secrecy system, a receiving station comprising mechanism for measuring a succession of timed intervals, devices to be actuated selectively in response to energy received in definite control intervals, and means responsive to energy received at other intervals intermediate said control intervals for restoring actuated devices and locking all of the devices against operation by energy received in the remaining intervals of the succession.

18. In a secrecy control system, a receiving station having means to measure successions of timed intervals, devices to be actuated in response to energy received in different control intervals, means responsive to energy received in any one of a plurality of other intervals intermediate the control intervals for restoring actuated devices and locking all of the devices against operation by energy received in any remaining interval of the succession, and responsive to energy received in the final interval of a succession for locking the devices against operation throughout the next following succession.

19. In a secrecy system, a receiving station comprising mechanism for measuring a succession of timed intervals, devices to be controlled in response to received timed impulses, means responsive to received energy of a duration less than the first timed interval of a cycle for conditioning said devices for operation, means responsive to energy received in a subsequent timed interval for restoring the conditioning means and locking said devices against operation, and means responsive to energy received in a next subsequent timed interval for actuating a conditioned device, whereby a device is actuated only by timed intervals of received energy and no received energy.

20. In combination, a timing member, a controlled mechanism associated therewith and responsive to received controlling impulses of time of occurance and duration according to a prearranged code, means responsive to energy received at a time or of a duration not in accordance with said code for locking said mechanism against response to received energy, and means controlled by said member for unlocking said mechanism.

In witness whereof, I hereunto subscribe my name this 29th day of November, A. D., 1920.

ARTHUR A. OSWALD.